Oct. 26, 1937.  P. R. SCHREURS  2,097,216
GAS SEPARATOR
Filed Aug. 6, 1935  2 Sheets-Sheet 1
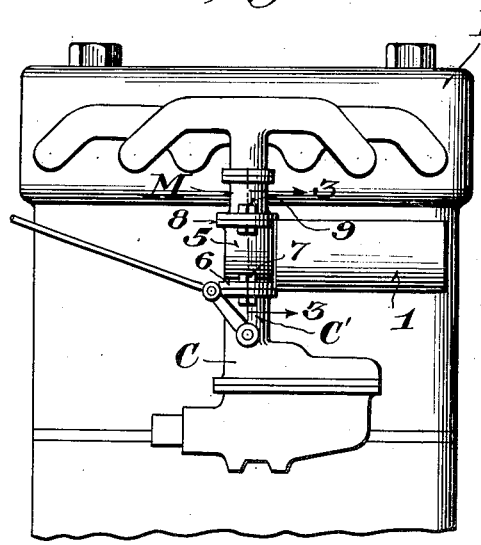
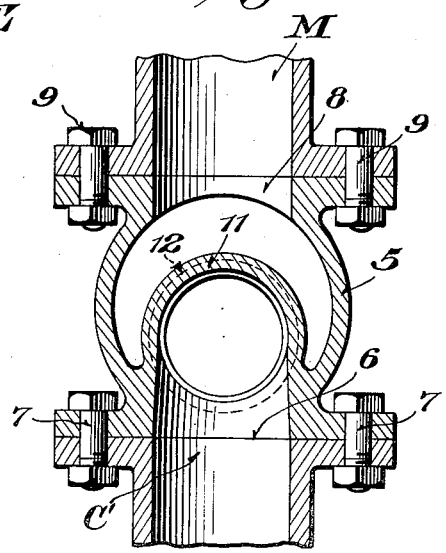
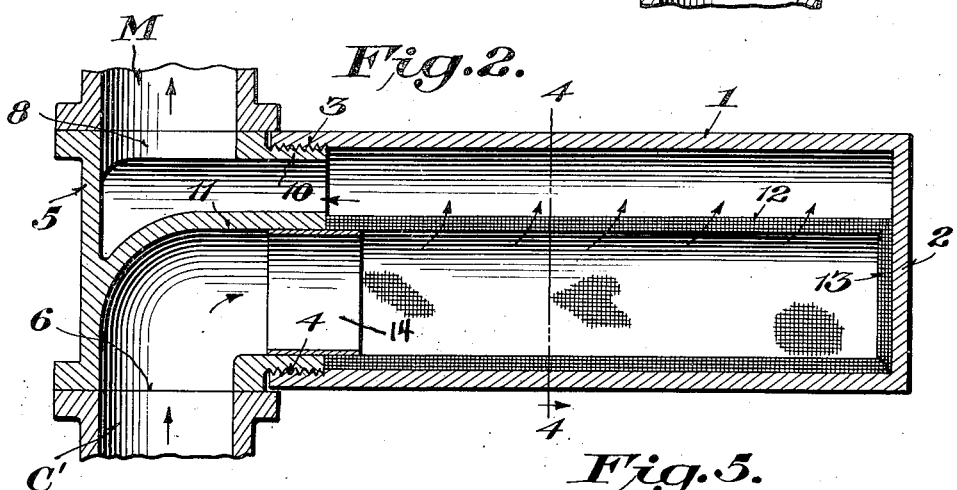
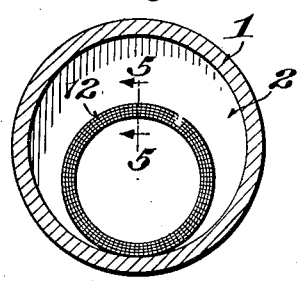

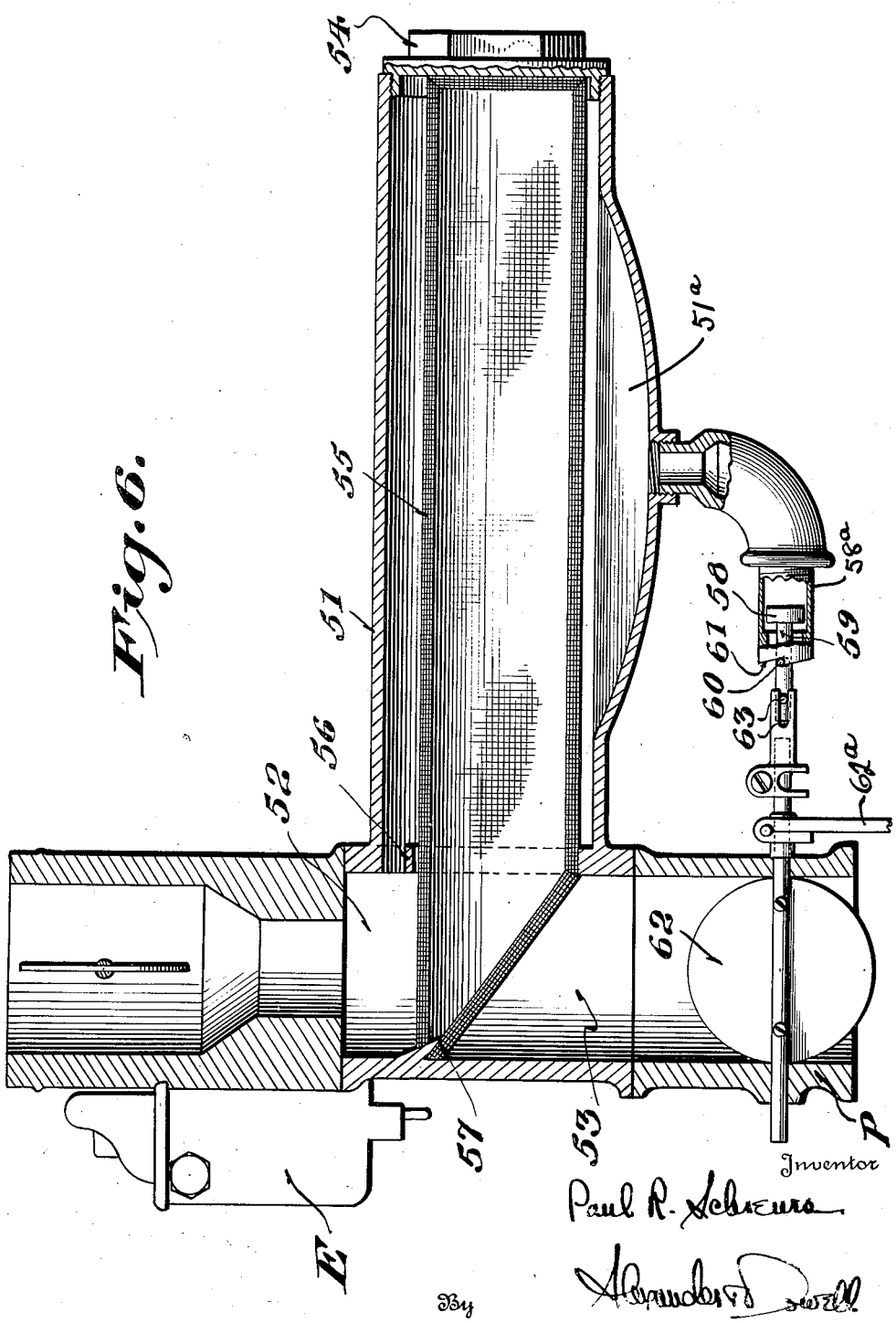

Patented Oct. 26, 1937

2,097,216

UNITED STATES PATENT OFFICE 2,097,216

GAS SEPARATOR

Paul R. Schreurs, Muscatine, Iowa

Application August 6, 1935, Serial No. 34,989

7 Claims. (Cl. 48—180)

This invention is a novel apparatus, which I term a gas separator, for producing an improved combustible gas from light hydrocarbons (such as gasoline) especially adapted for use as fuel vapors for internal combustion engines and the like. The principal object of the invention is to provide a gas produced by passing air or air laden gasoline vapors through a specially designed tubular filter member interposed between the carburetor and the intake manifold of the engine, which filter will effectively clean the air and gasoline so that any foreign matters therein will be prevented from passing into the cylinders of the engine; also to provide a filter member which while accomplishing the above result will materially prevent the passage of any liquid particles or globules, thereby producing an exceedingly powerful gas containing substantially no liquid or moist particles, and thereby producing a much better and a more ready inflammable gaseous fuel because of the fact that the globules are very materially reduced and the fuel more thoroughly mixed after passing through the filter.

Another object of the invention is to provide a gas separator which may be interposed between the means for producing a mixture of atomized or vaporized gasoline and air, which may be either up draft or down draft carburetor, and the usual intake manifold of the engine, and consisting of a casing having a lateral extension with one or more tubular layers of metallic filter cloth of exceedingly fine mesh (about 500 mesh) disposed therein between the inlet and outlet to form a relatively dense filter screen, and several important features of my novel combined air and gasoline cleaner and mixer being the simplicity of construction and design, and the easy removability of the filter which makes it particularly desirable to automobile or engine operators, in view of the fact that the gas separator may be taken apart and a new filter member installed in one to two minutes. Moreover, if my filter member becomes dirty its efficiency as an air-and-gasoline mixer in fact is increased since it will retain the hydrocarbon particles or globules therein for a longer period, and hence the gas separator is extremely economical with respect to gas consumption.

The present invention is an improvement upon my U. S. Letters Patent No. 1,967,133 dated July 17, 1934; and Patent No. 2,057,165 dated October 13, 1936; and Patent No. 2,041,435 dated May 19, 1936.

To enable others to understand and use the invention I will explain a practical embodiment thereof as illustrated in the accompanying drawings; and in the appended claims will summarize the essentials of the invention, and novel features of construction, and novel combinations of parts, for which protection is desired.

In said drawings:—

Fig. 1 is an elevation showing my novel gas separator interposed between the conventional updraft carburetor and intake manifold of an internal combustion engine.

Fig. 2 is an enlarged vertical section through the gas separator.

Fig. 3 is an enlarged transverse section taken on the line 3—3, Fig. 1.

Fig. 4 is a transverse detail section on the line 4—4, Fig. 2.

Fig. 5 is an enlarged transverse section on the line 5—5, Fig. 4.

Fig. 6 is a vertical section similar to Fig. 1 showing a modified form of the gas separator interposed between a conventional downdraft carburetor and the main throttle valve.

As shown in Figs. 1-5, the gas separator comprises a hollow T-shaped head 5 which is provided with a flanged inlet 6 which may be connected by bolts 7 to the flanged outlet C' of the carburetor C. Head 5 also has a flanged outlet 8 which may be connected by bolts 9 to the flanged intake manifold M of the engine E. Inlet 6 however might be connected to any device producing a fine mixture of hydrocarbon vapors or atoms and air; and outlet 8 might be connected to any suitable suction apparatus by which the gases can be withdrawn and delivered to the point of utilization or storage.

Head 5 is provided with a tubular extension 10 which communicates directly with the outlet 8, the outer end of extension 10 being threaded as at 4 to receive a cylindrical cap 1 closed at its outer end by a wall 2, and having interior threads 3 to engage the exterior threads 4. Within extension 10 is a smaller tubular extension 11 which connects and registers directly with the inlet 6, the outer end of the extension 11 terminating substantially at the outer end of the extension 10. The axis of extension 11 is off-set from the axis of extension 10 so that its lower portion is disposed substantially tangent to the lower portion of extension 10, as shown.

Within cap 1 is a tubular filter member 12 comprising one or more thicknesses 12x (Fig. 5) of metallic filter cloth of exceedingly fine mesh (about 500 mesh). Where more than one thickness is used, the layers may be superimposed or wrapped spirally to form a dense wall of substantial thickness. The outer end of tubular filter 12 is closed by a wall 13 of similar filter cloth (or closed by a plate) soldered to the outer end of the filter 12. The inner end of the tubular filter 12 is soldered to a ferrule or collar 14 adapted to fit snugly within the inner periphery of the tubular extension 11 whereby filter 12 will be properly positioned in the casing 1 substantially tangent to the lower portion thereof, and will be conveniently retained in the extension 11 by contact of the outer wall 2 of the cap 1 against the outer end 13 of the filter as shown in Fig. 2.

The filter 12 may be readily manufactured by wrapping one or more layers 12$x$ around a suitable cylindrical form of desired size and length, and the filter thus formed will be substantially impervious to liquids and will effectively retain unvaporized particles of hydrocarbons or oils that may be introduced by carburetor C directly into the filter 12, but will permit substantially dry gas to pass or be drawn therethrough and to be passed on to the intake manifold M. Ungasified particles or any parts of the gasoline or distillates such as kerosene or heavy carbons will be detained in filter 12, and the filter will thus cause a thorough mixing of the air and fuel vapors, and will produce a substantially dry gas supply for the engine, eliminating "heavy ends" such as lubricating oil and kerosene with which much commercial gasoline is contaminated and which would otherwise enter and eventually carbonize the cylinders and valves.

Dealers in automobiles having air-filters for the carburetors at the present time usually recommend that such filters be cleaned every two thousand miles, an operation which involves both time and expense; whereas, if the gasoline is not unusually dirty or full of "heavy ends", my filter may be used for many thousands of miles without cleaning to maintain a supply of clean gaseous fuel to the intake manifold, free of dirt and heavy ends, and moreover, my apparatus will save gas consumption. I have found that most gasoline contains a fine substance, like powdered emery, which is very hard. The particles are so minute that they are not visible without the aid of a magnifying glass, and these particles will float. As my filter is of much finer mesh than filters heretofore used, my filter will remove much more of the foreign matters from ordinary gasoline, and will furthermore separate the heavy distillate from the gasoline.

The filter 12 may be removed and a new filter intalled in the cap 1 in a few minutes by merely unscrewing the cap, pulling out the old filter and inserting a new one in its place, and then screwing the cap back into position on extension 10 to lock the filter in place.

The gas separator may be used with either an updraft or downdraft carburetor. When used with a downdraft carburetor since the filter is necessarily disposed below the carburetor, and the gasoline will not only clean the air but will also clean the filter while the engine is operating, permitting the device to be used with high efficiency for an unusually long period of time.

Fig. 6 illustrates the application of a somewhat modified gas separator to a downdraft carburetor. In this modification, the gas separator casing 51 is disposed below downdraft carburetor E, the casing 51 having a flanged inlet 52, and a flanged outlet 53, secured respectively to the outlet of carburetor E and to the casing for the throttle valve 62. Throttle valve 62 is operated by an arm 62$a$ controlled by a suitable control rod (not shown) in the usual manner. The casing 51 has a threaded cap 54 at its outer end, and the filter screen 55 is maintained in casing 51 by the cap, said screen passing through a centering ring 56 formed in the casing 51, the inner end of screen 55 underlying a lip 57 on the end wall of the casing.

An automatic air control valve is provided for the casing 51 which permits evaporation of considerably more of the heavy ends of the gasoline, as they accumulate in the bottom 51$a$ of the casing, by injecting an excess amount of air into the bottom of the casing thereby making the gas drier, lighter, and easier to ignite; and such excess air also tends to cool and clean the engine. The stem 59 of the automatic valve 58 has a slot and pin connection 63 with the shaft of throttle valve 62, but is shifted axially by a pin 60 engaging a cam surface 61 formed on the end of the valve casing 58$a$, so that when the throttle valve 62 is open the stem 59 will be rotated into such position that the pin 60 will permit the suction set up by the engine in casing 52 to draw open the valve 58. When however throttle valve 62 is closed, stem 59 is rotated to cause pin 60 to positively close the valve 58. When the automatic air valve 58 is open the excess air passes into the bottom 51$a$ of casing 51, the air passing through the gasoline in the bottom of the casing and assisting in vaporizing the gasoline therein, also the surplus accumulation, and saves the pumping back of the unvaporized gasoline to a large extent. Also the opening of valve 58 breaks the suction at the carburetor and reduces the gasoline supply entering the casing, and thus causes utilization of the surplus accumulated in the pit 51$a$.

The cubical content of the members 1 and 51 should be such as will supply all the gaseous fuel required by the engine when operating under maximum load; and preferably also such as will greatly reduce the velocity of the air passing through the gas separator as compared with the velocity of the mixture entering the gas separator from the carburetor.

The gas being of high power can be easily ignited, and for internal combustion engines is preferably produced only as used. If it should be desired to store the gas an expansible holder should be provided therefor. By the use of my gas separator the efficiency and power of the engine is greatly increased; the engine can be started in "high" without jerking; the carburetor will not choke or flood; and the oil in the engine cylinders will not be contaminated by carbon or gasoline; and as impurities are not carried over by or with the gas no carbon is deposited in the cylinders. By actual tests automobiles have been found to have greater power and to give much better mileage than before the gas separators were applied thereto.

I claim:—

1. A gas separator for internal combustion engines comprising a casing having an inlet for a mixture of air and hydrocarbon vapors and having an outlet for gas disposed in substantial alignment with the inlet; a lateral extension on said casing; a filter in said extension and extending across the casing between the inlet and outlet; and means adapted to automatically admit an excess of air into the lower portion of the extension around the filter.

2. In a gas separator as set forth in claim 1, said filter comprising a tube removably inserted in the extension; and a removable cap on the outer end of the extension maintaining the filter tube in position in the casing.

3. In a gas separator as set forth in claim 1, said filter comprising a tube removably inserted in the extension; an annular guide member in the casing adapted to telescope the end of the tube; and a removable cap on the outer end of the extension maintaining the filter tube in position in the casing.

4. A gas separator for internal combustion engines comprising a casing having an inlet for a mixture of air and hydrocarbon vapors and having an outlet for gas disposed in substantial alignment with the inlet; a lateral extension on said casing; a filter in said extension and extending across the casing between the inlet and outlet, said filter consisting of metallic filter cloth of very fine mesh; and means adapted to automatically admit an excess of air into the lower portion of the extension around the filter.

5. In a gas separator as set forth in claim 4, said filter comprising a tube removably inserted in the extension; and a removable cap on the outer end of the extension maintaining the filter tube in position in the casing.

6. In a gas separator as set forth in claim 4, said filter comprising a tube removably inserted in the extension; an annular guide member in the casing adapted to telescope the end of the tube; and a removable cap on the outer end of the extension maintaining the filter tube in position in the casing.

7. A gas separator for internal combustion engines; comprising a tubular casing having an inlet adapted to be connected with the outlet of a carburetor and an outlet for the escape of gas; a tubular member having walls comprising a plurality of closely adjacent layers of metallic filter cloth approximately 500 mesh extending across said casing between the inlet and outlet, said member preventing passing of ungasified particles of fuel through the casing; and means for automatically admitting excess air into the lower portion of the casing around the member.

PAUL R. SCHREURS.